United States Patent
Hayashida

(10) Patent No.: US 10,078,755 B2
(45) Date of Patent: Sep. 18, 2018

(54) PRIVATE AND PUBLIC APPLICATIONS

(75) Inventor: Jeffrey Y. Hayashida, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/118,040

(22) Filed: May 27, 2011

(65) Prior Publication Data

US 2012/0304280 A1  Nov. 29, 2012

(51) Int. Cl.
- *G06F 7/04* (2006.01)
- *G06F 21/62* (2013.01)
- *G06F 12/00* (2006.01)

(52) U.S. Cl.
CPC ........ *G06F 21/6218* (2013.01); *G06F 21/629* (2013.01); *G06F 2221/2105* (2013.01); *G06F 2221/2149* (2013.01)

(58) Field of Classification Search
CPC ............... G06F 21/629; G06F 21/31; G06F 2221/2111; H04L 63/08; H04L 63/0815
USPC ......... 726/16, 7, 17; 713/186, 189; 715/835, 715/836, 769
See application file for complete search history.

(56) References Cited

U.S. PATENT DOCUMENTS

| | | |
|---|---|---|
| 6,323,846 B1 | 11/2001 | Westerman et al. |
| 6,570,557 B1 | 5/2003 | Westerman et al. |
| 6,677,932 B1 | 1/2004 | Westerman |
| 7,593,000 B1 | 9/2009 | Chin |
| 8,176,437 B1 * | 5/2012 | Taubman ............ G06F 9/44578 715/757 |
| 9,042,942 B2 * | 5/2015 | Jeong ................ H04M 1/72572 455/457 |
| 2002/0015024 A1 | 2/2002 | Westerman et al. |
| 2002/0160817 A1 * | 10/2002 | Salmimaa ........... G06F 3/04817 455/566 |
| 2004/0043758 A1 * | 3/2004 | Sorvari ............ G06F 17/30884 455/414.1 |
| 2004/0123118 A1 | 6/2004 | Dahan et al. |

(Continued)

FOREIGN PATENT DOCUMENTS

| | | |
|---|---|---|
| CN | 1801975 | 7/2006 |
| CN | 1968500 | 5/2007 |

(Continued)

OTHER PUBLICATIONS

International Search Report and Written Opinion from PCT/US2012/036172 filed May 2, 2012, received Aug. 19, 2012. 12 pages.

(Continued)

*Primary Examiner* — Gary S Gracia
(74) *Attorney, Agent, or Firm* — Fish & Richardson P.C.

(57) ABSTRACT

Designating applications for public access or private access on a computing device is disclosed. An application on the computing device is designated for private functionality or public functionality. A security wall is enforced with respect to the application if the application is designated for private functionality, wherein enforcing the security wall includes preventing access to the application until a security input is received. Access to the application is provided if the application is designated for public functionality, wherein providing access to the application includes allowing a user to access the application without receiving the security input from the user.

13 Claims, 10 Drawing Sheets

(56) References Cited

U.S. PATENT DOCUMENTS

| | | | |
|---|---|---|---|
| 2004/0155909 A1* | 8/2004 | Wagner | G06F 3/04817 715/854 |
| 2006/0012577 A1 | 1/2006 | Kyrola | |
| 2006/0156209 A1* | 7/2006 | Matsuura | G06Q 10/10 714/798 |
| 2007/0083827 A1* | 4/2007 | Scott | G06F 9/4443 715/811 |
| 2007/0204224 A1 | 8/2007 | Kenagy | |
| 2008/0020803 A1* | 1/2008 | Rios | H04M 1/667 455/565 |
| 2008/0034217 A1* | 2/2008 | McQuaide | H04B 1/202 713/186 |
| 2008/0214210 A1* | 9/2008 | Rasanen | H04W 4/02 455/456.3 |
| 2008/0254767 A1* | 10/2008 | Jin | H04M 1/667 455/411 |
| 2008/0263024 A1* | 10/2008 | Landschaft | G06F 17/3087 |
| 2009/0083847 A1 | 3/2009 | Fadell et al. | |
| 2009/0170532 A1* | 7/2009 | Lee | H04M 1/72566 455/456.3 |
| 2009/0174680 A1* | 7/2009 | Anzures | G06F 1/1626 345/173 |
| 2010/0001967 A1* | 1/2010 | Yoo | G06F 3/0488 345/173 |
| 2010/0020035 A1 | 1/2010 | Ryu et al. | |
| 2010/0024020 A1* | 1/2010 | Baugher | G06F 21/6245 726/7 |
| 2010/0024028 A1* | 1/2010 | Baugher | G06F 21/62 726/17 |
| 2010/0078472 A1* | 4/2010 | Lin | G06Q 20/32 235/379 |
| 2010/0082481 A1* | 4/2010 | Lin | G06Q 20/042 705/41 |
| 2010/0146437 A1* | 6/2010 | Woodcock | G06Q 30/06 715/806 |
| 2010/0159995 A1 | 6/2010 | Stallings et al. | |
| 2010/0162182 A1 | 6/2010 | Oh et al. | |
| 2010/0197352 A1 | 8/2010 | Runstedler et al. | |
| 2010/0235882 A1* | 9/2010 | Moore | G06Q 20/06 726/3 |
| 2010/0265182 A1* | 10/2010 | Ball | G06F 3/0238 345/168 |
| 2010/0306693 A1 | 12/2010 | Brinda | |
| 2010/0306705 A1 | 12/2010 | Nilsson | |
| 2010/0317371 A1* | 12/2010 | Westerinen | H04M 1/72566 455/456.6 |
| 2010/0322485 A1 | 12/2010 | Riddiford | |
| 2010/0332825 A1 | 12/2010 | Bradley, II et al. | |
| 2011/0010761 A1* | 1/2011 | Doyle | G06F 21/6218 726/5 |
| 2011/0028186 A1* | 2/2011 | Lee | G06F 3/0486 455/566 |
| 2011/0061008 A1* | 3/2011 | Gupta | G06F 17/30598 715/764 |
| 2011/0081911 A1* | 4/2011 | Silver | H04L 12/66 455/445 |
| 2011/0088003 A1* | 4/2011 | Swink | H04L 51/32 715/863 |
| 2011/0117970 A1* | 5/2011 | Choi | G06F 3/0416 455/566 |
| 2011/0159844 A1* | 6/2011 | Gillet | H04M 1/673 455/411 |
| 2011/0163972 A1 | 7/2011 | Anzures et al. | |
| 2011/0167357 A1* | 7/2011 | Benjamin | H04L 12/1818 715/753 |
| 2011/0185186 A1* | 7/2011 | Adams | H04L 9/0891 713/189 |
| 2011/0187497 A1 | 8/2011 | Chin | |
| 2011/0252238 A1* | 10/2011 | Abuan | H04L 61/2575 713/168 |
| 2011/0319169 A1 | 12/2011 | Lan et al. | |
| 2012/0009896 A1* | 1/2012 | Bandyopadhyay | G06F 1/1643 455/411 |
| 2012/0023573 A1* | 1/2012 | Shi | G06F 3/04883 726/17 |
| 2012/0046077 A1* | 2/2012 | Kim | H04M 1/72577 455/566 |
| 2012/0050689 A1* | 3/2012 | Cudak | G03B 17/54 353/30 |
| 2012/0054631 A1* | 3/2012 | Nurmi | G06F 3/0481 715/744 |
| 2012/0066629 A1* | 3/2012 | Lee | G06F 3/04847 715/769 |
| 2012/0079265 A1* | 3/2012 | Ferren | G02B 13/0065 713/100 |
| 2012/0084691 A1* | 4/2012 | Yun | H04M 1/72519 715/769 |
| 2012/0084734 A1* | 4/2012 | Wilairat | G06F 21/629 715/863 |
| 2012/0098639 A1* | 4/2012 | Ijas | G06F 3/04883 340/5.51 |
| 2012/0108166 A1* | 5/2012 | Hymel | H04M 1/67 455/26.1 |
| 2012/0115438 A1* | 5/2012 | Umealu | H04M 1/66 455/411 |
| 2012/0137301 A1* | 5/2012 | Roslak | H04M 1/72563 718/103 |
| 2012/0184247 A1* | 7/2012 | Choe | G06F 3/04883 455/411 |
| 2012/0185803 A1* | 7/2012 | Wang | G06F 3/04817 715/847 |
| 2012/0233571 A1* | 9/2012 | Wever | G06F 3/048 715/835 |
| 2012/0258696 A1* | 10/2012 | Nam | H04W 4/02 455/414.2 |
| 2012/0284673 A1* | 11/2012 | Lamb | G06F 3/04883 715/863 |
| 2012/0311499 A1* | 12/2012 | Dellinger | H04N 5/23206 715/835 |
| 2013/0187753 A1* | 7/2013 | Chiriyankandath | G06F 3/0488 340/5.51 |
| 2013/0311955 A9* | 11/2013 | de Leon | G06F 3/017 715/863 |

FOREIGN PATENT DOCUMENTS

| | | |
|---|---|---|
| CN | 1976532 | 6/2007 |
| CN | 101625620 | 1/2010 |
| CN | 101699835 | 4/2010 |
| CN | 101809581 | 8/2010 |
| CN | 101815339 | 8/2010 |
| JP | 1995- 129355 | 5/1995 |
| JP | 2011- 087306 | 4/2011 |
| KR | 10-2011-0039063 | 4/2011 |
| WO | 01/25918 A2 | 4/2001 |
| WO | WO 2009/125862 | 10/2009 |
| WO | WO2010043277 A1 | 4/2010 |
| WO | WO 2010/065752 | 6/2010 |
| WO | WO 2010/136854 | 12/2010 |

OTHER PUBLICATIONS

"Ubuntuusers Wiki: sudo", Published May 17, 2011. Retrieved from the internet: URL:http://wiki.ubuntuusers.de/sudo?rev=234535 [retrieved on Jul. 2, 2012]. 7 Pages.

Kellex, "In Preparation for tomorrow's DROID Froyo OTA Update . . . ," published Aug. 2, 2010, retrieved Jan. 9, 2013, retrieved from the Internet: <URL: http://www.droid-life.com/2010/08/02/in-preparation-for-tomorrows-droid-froyo-ota-updated/>, 8 pages.

Kevin, "WidgetLocker," published Aug. 30, 2010, retrieved Jan. 8, 2013, retrieved from the Internet: <URL: http://web.archive.org/web/20100830222153/http://teslacoilsw.com/taxonomy/term/20>, 7 pages.

Rohan, "What Does the Pressure Sensor Measure?" Published Oct. 4, 2010, retrieved Jan. 9, 2013, retrieved from the Internet: <URL: http://android.stackexchange.com/questions/1894/what-does-the-pressure-senso-measure>, 2 pages.

(56) References Cited

OTHER PUBLICATIONS

International Search Report and Written Opinion for PCT/US2012/058052, mailed Feb. 6, 2013, 10 pages.
Chinese Office Action in Appl. No. 201280023103.9, dated Mar. 17, 2016, 19 pages.
Chinese Office Action for Application No. 201280023103.9, dated Nov. 17, 20146, 22 pages (With English Translation).
Australian Office Action for Application No. 2016200647, dated Nov. 23, 2016, 5 pages.
Korean Intellectual Property Office Notice of preliminary Rejection for Application No. 10-2015-7034136, dated Jun. 1, 2017, 8 pages.

\* cited by examiner

PRIVATE AND PUBLIC APPLICATIONS

TECHNICAL FIELD

This disclosure relates generally to designating applications for public access or private access on a computing device.

BACKGROUND

Computing devices often implement security measures to prevent unwanted or accidental access to applications, features, or information provided by the computing devices. Computing devices frequently store sensitive information that a user may not want other users to view. Users may also generally want to restrict access to their computing devices by other users as a matter of personal preference. Example security measures implemented on computing devices to prevent unwanted access include enforcing a security wall to prevent access to applications on the computing device unless a particular security input is received. Typically, a security code, password, or particular sequence of other inputs is required as a security input to access applications on a computing device when a security wall is implemented on the device.

Although enforcement of the security wall restricts unwanted access to applications on a computing device, the security wall also prevents the owner of the computing device from easily accessing applications on the computing device. In most instances, the user attempting to access the computing device is the owner of the computing device or an authorized user. Further, some applications on the computing device may be associated with private information while other applications have little or no private aspect.

SUMMARY

In a first general aspect, a method for designating applications for public access or private access on a computing device is disclosed. An application on the computing device is designated for private functionality or public functionality. A security wall is enforced with respect to the application if the application is designated for private functionality, wherein enforcing the security wall includes preventing access to the application until a security input is received. Access to the application is provided if the application is designated for public functionality, wherein providing access to the application includes allowing a user to access the application without receiving the security input from the user.

Implementations can include any or all of the following features. Providing access to the application includes requiring a second input from the user before allowing the user to access the application, the second input different from the security input. The second input includes a predefined sequence of multiple inputs associated with a tactile button on the computer system, the tactile button associated with receiving input for a functionality of the computer system different from functionality provided by the application. The application is designated based on a request received from the user. The application is automatically designated based on at least one of an application type associated with the application, a time since the application was previously accessed, or a frequency of use of the application. Providing access to the application includes generating for display a visual indicator of availability of the application in a public mode of the computer system. Generating the visual indicator for display includes displaying a particular visual indicator for each application in a group of applications, wherein each application in the group of applications is designated for public functionality. The group of applications is a subset of all applications designated for public functionality and the displayed group of applications is displayed based on at least one of a geographic location of the computer system, a current date or time of day, a context associated with the user, a recent action performed by the user, or a level of importance of information associated with a particular application.

Designating the application for public or private functionality includes designating at least one of a plurality of functions of the application for public functionality while designating a remaining portion of the plurality of functions of the application for private functionality. Enforcing the security wall includes preventing access to the remaining portion of the plurality of functions designated for private functionality until the security input is received and allowing the user to access the at least one function of the application designated for public functionality without receiving the security input. The method further comprises automatically designating a particular application for private functionality after a certain time period has elapsed since a previous use of the particular application.

In a second general aspect, a computer program product is tangibly embodied in a computer-readable storage medium and includes instructions that, when executed, determine that a first functionality of an application is designated for public functionality and a second functionality of the application is designated for private functionality. Access is provided to the first functionality of the application, wherein providing access to the first functionality of the application includes allowing a user to access the first functionality of the application without receiving a security input from the user. A security wall is enforced with respect to the second functionality of the application, wherein enforcing the security wall includes preventing access to the second functionality of the application until the security input is received.

Implementations can include any or all of the following features. Providing access to the first functionality of the application includes requiring a second input from the user before allowing the user to access the application, the second input different from the security input. The second functionality of the application includes a purchasing functionality allowing the user to conduct a purchase through the application. The first functionality of the application is automatically determined as designated for public functionality based on a type of functionality associated with the first functionality and the second functionality of the application is automatically determined as designated for private functionality based on a type of functionality associated with the second functionality.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A computing device can implement a security wall to prohibit unwanted users from accessing functionality provided by the computing device. Instead of applying the security wall to all functionality of the computing device, the computing device can apply the security wall only to functionality designated as private while allowing user access to functionality designated as public. Accordingly, a security input that is normally required to bypass the security wall is not required for access to public functionality on the computing device. The determination of whether particular functionality in the computing device is public or private can be based on various factors including a designation received from a user or a context of the computing device. Further, other inputs different from the security input may still be required for access to public functionality.

Figure 1:
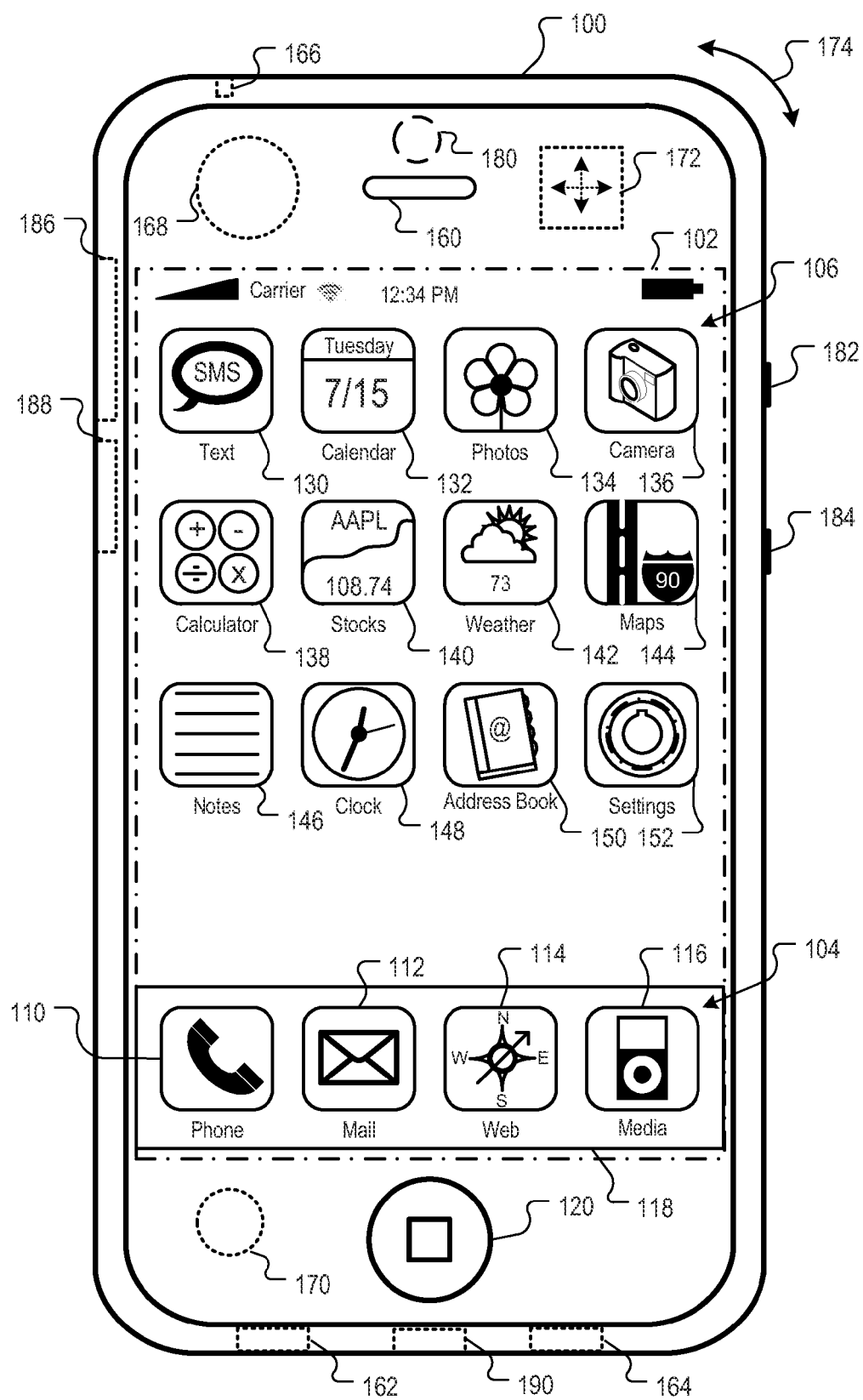
FIG. 1 is a block diagram of an example mobile device.

FIG. 1 is a block diagram of an example mobile device 100. The mobile device 100 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or other electronic device or a combination of any two or more of these data processing devices or other data processing devices. Although the description below refers generally to mobile device 100, any computing device, including a personal computer, laptop, or tablet, may be used in accordance with the features described in the present disclosure.

Mobile Device Overview

In some implementations, the mobile device 100 includes a touch-sensitive display 102. The touch-sensitive display 102 can implement liquid crystal display (LCD) technology, light emitting polymer display (LPD) technology, or some other display technology. The touch-sensitive display 102 can be sensitive to haptic and/or tactile contact with a user.

In some implementations, the touch-sensitive display 102 can comprise a multi-touch-sensitive display 102. A multi-touch-sensitive display 102 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device. An example of a multi-touch-sensitive display technology is described in U.S. Pat. Nos. 6,323,846; 6,570,557; 6,677,932; and U.S. Patent Publication No. 2002/0015024A1, each of which is incorporated by reference herein in its entirety.

In some implementations, the mobile device 100 can display one or more graphical user interfaces on the touch-sensitive display 102 for providing the user access to various system objects and for conveying information to the user. In some implementations, the graphical user interface can include one or more display objects 104, 106. Each of the display objects 104, 106 can be a graphic representation of a system object. Some examples of system objects include device functions, applications, windows, files, alerts, events, or other identifiable system objects.

Example Mobile Device Functionality

In some implementations, the mobile device 100 can implement multiple device functionalities, such as a telephony device, as indicated by a phone object 110; an e-mail device, as indicated by the e-mail object 112; a network data communication device, as indicated by the Web object 114; a Wi-Fi base station device (not shown); and a media processing device, as indicated by the media player object 116. In some implementations, particular device objects 104, e.g., the phone object 110, the e-mail object 112, the Web object 114, and the media player object 116, can be displayed in a menu bar 118. In some implementations, each of the device functionalities can be accessed from a top-level graphical user interface, such as the graphical user interface illustrated in FIG. 1. The objects 110, 112, 114 and 116 represent visual indicators of applications on the mobile device 100. Touching one of the objects 110, 112, 114 or 116 can, for example, invoke the corresponding functionality.

In some implementations, the mobile device 100 can implement network distribution functionality. For example, the functionality can enable the user to take the mobile device 100 and its associated network while traveling. In particular, the mobile device 100 can extend Internet access (e.g., via Wi-Fi) to other wireless devices in the vicinity. For example, mobile device 100 can be configured as a base station for one or more devices. As such, mobile device 100 can grant or deny network access to other wireless devices.

In some implementations, upon invocation of particular device functionality, the graphical user interface of the mobile device 100 changes, or is augmented or replaced with another user interface or user interface elements, to facilitate user access to particular functions associated with the corresponding device functionality. For example, in response to a user touching the phone object 110, the graphical user interface of the touch-sensitive display 102 may present display objects related to various phone functions; likewise, touching of the email object 112 may cause the graphical user interface to present display objects related to various e-mail functions; touching the Web object 114 may cause the graphical user interface to present display objects related to various Web-surfing functions; and touching the media player object 116 may cause the graphical user interface to present display objects related to various media processing functions.

In some implementations, the top-level graphical user interface environment or state of FIG. 1 can be restored by pressing a button 120 located near the bottom of the mobile device 100. In some implementations, each corresponding device functionality may have corresponding "home" display objects displayed on the touch-sensitive display 102, and the graphical user interface environment of FIG. 1 can be restored by pressing the "home" display object.

In some implementations, the top-level graphical user interface can include additional display objects 106, such as a short messaging service (SMS) object 130, a calendar object 132, a photos object 134, a camera object 136, a calculator object 138, a stocks object 140, a weather object 142, a maps object 144, a notes object 146, a clock object 148, an address book object 150, and a settings object 152. Touching the SMS display object 130 can, for example, invoke an SMS messaging environment and supporting functionality. Likewise, each selection of a display object 132, 134, 136, 138, 140, 142, 144, 146, 148, 150 and 152 can invoke a corresponding object environment and functionality.

Additional and/or different display objects can also be displayed in the graphical user interface of FIG. 1. For example, if the device 100 is functioning as a base station for other devices, one or more "connection" objects may appear in the graphical user interface to indicate the connection. In some implementations, the display objects 106 can be configured by a user, e.g., a user may specify which display objects 106 are displayed, and/or may download additional applications or other software that provides other functionalities and corresponding display objects.

In some implementations, the mobile device 100 can include one or more input/output (I/O) devices and/or sensor devices. For example, a speaker 160 and a microphone 162 can be included to facilitate voice-enabled functionalities, such as phone and voice mail functions. In some implementations, a loud speaker 164 can be included to facilitate hands-free voice functionalities, such as speaker phone functions. An audio jack 166 can also be included for use of headphones and/or a microphone.

In some implementations, a proximity sensor 168 can be included to facilitate the detection of the user positioning the mobile device 100 proximate to the user's ear and, in response, to disengage the touch-sensitive display 102 to prevent accidental function invocations. In some implementations, the touch-sensitive display 102 can be turned off to conserve additional power when the mobile device 100 is proximate to the user's ear.

Other sensors can also be used. For example, in some implementations, an ambient light sensor 170 can be utilized to facilitate adjusting the brightness of the touch-sensitive display 102. In some implementations, an accelerometer 172 can be utilized to detect movement of the mobile device 100, as indicated by the directional arrow 174. Accordingly, display objects and/or media can be presented according to a detected orientation, e.g., portrait or landscape. In some implementations, the mobile device 100 may include circuitry and sensors for supporting a location determining capability, such as that provided by the global positioning system (GPS) or other positioning system (e.g., systems using Wi-Fi access points, television signals, cellular grids, Uniform Resource Locators (URLs)). In some implementations, a positioning system (e.g., a GPS receiver) can be integrated into the mobile device 100 or provided as a separate device that can be coupled to the mobile device 100 through an interface (e.g., port device 190) to provide access to location-based services.

The mobile device 100 can also include a camera lens and sensor 180. In some implementations, the camera lens and sensor 180 can be located on the back surface of the mobile device 100. The camera can capture still images and/or video.

The mobile device 100 can also include one or more wireless communication subsystems, such as a 802.11b/g communication device 186, and/or a Bluetooth™ communication device 188. Other communication protocols can also be supported, including other 802.x communication protocols (e.g., WiMax, Wi-Fi), code division multiple access (CDMA), global system for mobile communications (GSM), Enhanced Data GSM Environment (EDGE), 3G (e.g., EV-DO, UMTS, HSDPA), etc.

In some implementations, a port device 190, e.g., a Universal Serial Bus (USB) port, or a docking port, or some other wired port connection, can be included. The port device 190 can, for example, be utilized to establish a wired connection to other computing devices, such as other communication devices 100, a personal computer, a printer, or other processing devices capable of receiving and/or transmitting data. In some implementations, the port device 190 allows the mobile device 100 to synchronize with a host device using one or more protocols.

Network Operating Environment

Figure 2:
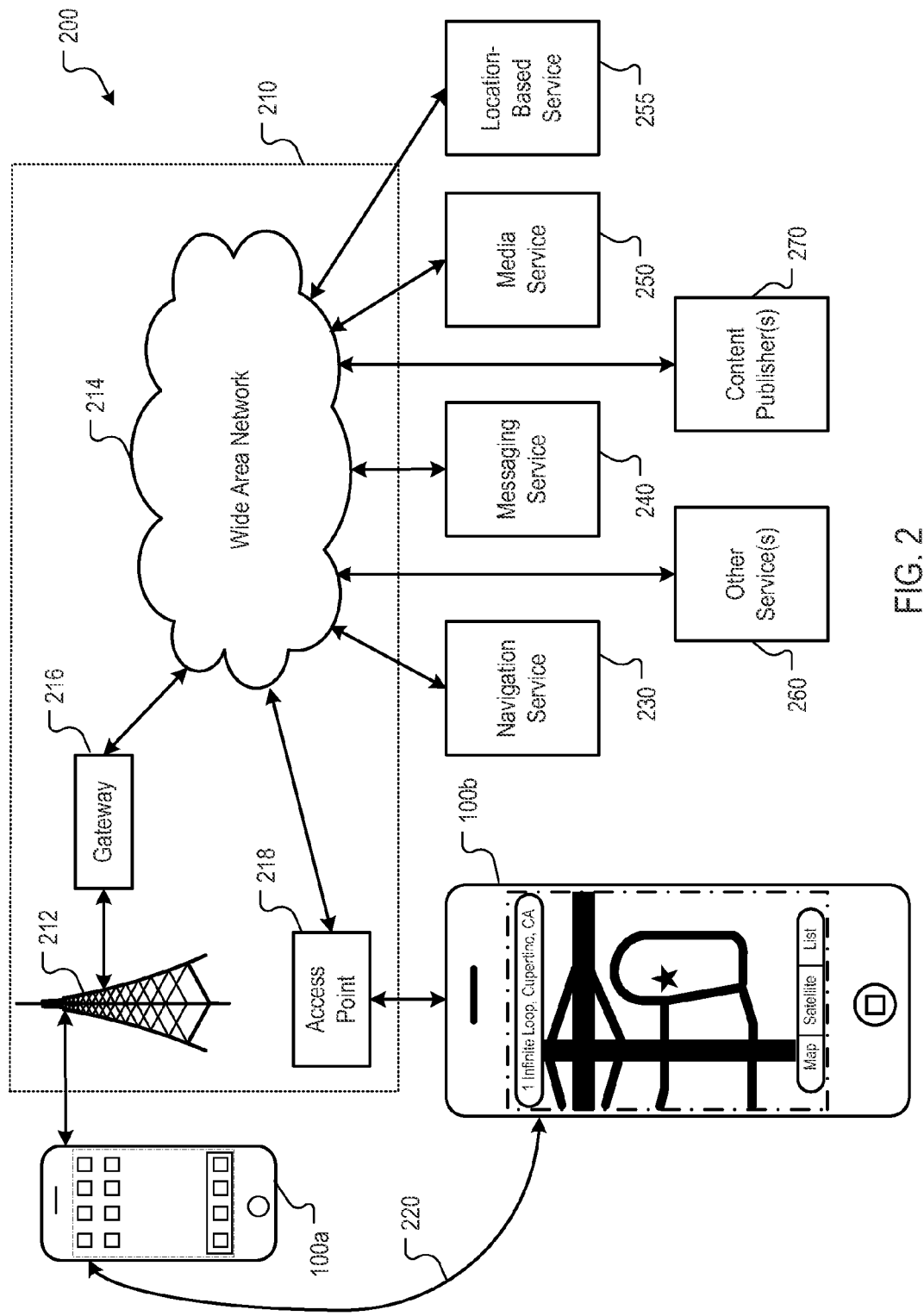
FIG. 2 is a block diagram of an example network operating environment for the mobile device of FIG. 1.

FIG. 2 is a block diagram of an example network operating environment 200 for the mobile device 100 of FIG. 1. The mobile device 100 of FIG. 1 can, for example, communicate over one or more wired and/or wireless networks 210 in data communication. For example, a wireless network 212, e.g., a cellular network, can communicate with a wide area network (WAN) 214, such as the Internet, by use of a gateway 216. Likewise, an access point 218, such as an 802.11g wireless access point, can provide communication access to the wide area network 214. In some implementations, both voice and data communications can be established over the wireless network 212 and the access point 218. For example, the mobile device 100a can place and receive phone calls (e.g., using VoIP protocols), send and receive e-mail messages (e.g., using POP3 protocol), and retrieve electronic documents and/or streams, such as web pages, photographs, and videos, over the wireless network 212, gateway 216, and wide area network 214 (e.g., using TCP/IP or UDP protocols). Likewise, the mobile device 100b can place and receive phone calls, send and receive e-mail messages, and retrieve electronic documents over the access point 218 and the wide area network 214. In some implementations, the mobile device 100 can be physically connected to the access point 218 using one or more cables and the access point 218 can be a personal computer. In this configuration, the mobile device 100 can be referred to as a "tethered" device.

The mobile devices 100a and 100b can also establish communications by other means. For example, the wireless device 100a can communicate with other wireless devices, e.g., other wireless devices 100, cell phones, etc., over the wireless network 212. Likewise, the mobile devices 100a and 100b can establish peer-to-peer communications 220, e.g., a personal area network, by use of one or more communication subsystems, such as the Bluetooth™ communication device 188 shown in FIG. 1. Other communication protocols and topologies can also be implemented.

The mobile device 100 can, for example, communicate with one or more services 230, 240, 250, 255, and 260 and/or one or more content publishers 270 over the one or more wired and/or wireless networks 210. For example, a navigation service 230 can provide navigation information, e.g., map information, location information, route information, and other information, to the mobile device 100. In the example shown, a user of the mobile device 100b has invoked a map functionality, e.g., by touching the maps object 144 on the top-level graphical user interface shown in FIG. 1, and has requested and received a map for the location "1 Infinite Loop, Cupertino, Calif."

A messaging service 240 can, for example, provide e-mail and/or other messaging services. A media service 250 can, for example, provide access to media files, such as song files, movie files, video clips, and other media data. A location-based service 255 can, for example, provide data or content based on a current location of the mobile device 100. One or more other services 260 can also be utilized by the mobile device 100, including a syncing service, an activation service and a software update service that automatically determines whether software updates are available for software on the mobile device 100, then downloads the software updates to the mobile device 100 where the updates can be manually or automatically unpacked and/or installed.

The mobile device 100 can also access other data over the one or more wired and/or wireless networks 210. For example, content publishers 270, such as news sites, RSS feeds, web sites, blogs, social networking sites, developer networks, etc., can be accessed by the mobile device 100. Such access can be provided by invocation of a web browsing function or application (e.g., a browser) in response to a user touching the Web object 114.

Exemplary Display of Public and Private Applications

Figure 3A:
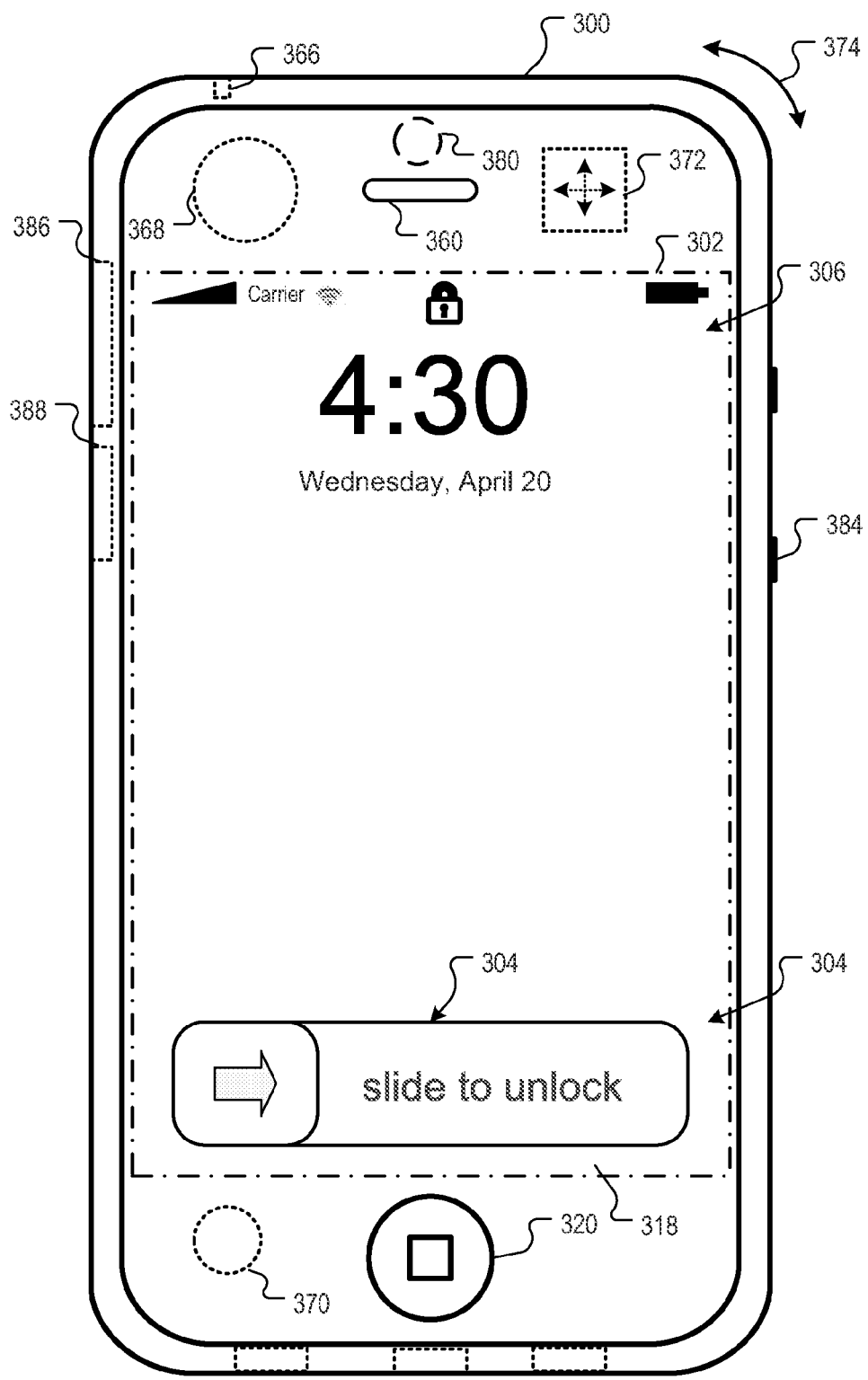
FIG. 3A is a block diagram of an example implementation of the mobile device of FIG. 1 with a security wall in standby mode.

FIGS. 3A-3E depict example displays of providing different levels of access to different applications on a computing device. Computing devices generally can be configured to implement a security wall to restrict unwanted or accidental access to functionality provided by the computing devices. FIG. 3A illustrates implementation of an example security measure for restricting access to applications on a mobile device 300. The mobile device 300 can enter a "stand-by" or "locked" mode as depicted in FIG. 3A. In a stand-by mode, mobile device 300 can enforce a security wall to prohibit access to functionality, applications, and information usually provided by the mobile device 300. In some instances, limited features can be presented during a stand-by mode of the mobile device 300, such as a current time and date, an indicator of remaining battery life, or a cellular reception signal strength. The remaining functionality provided by mobile device 300, however, can be restricted until a security input is received by the mobile device 300.

Figure 3B:
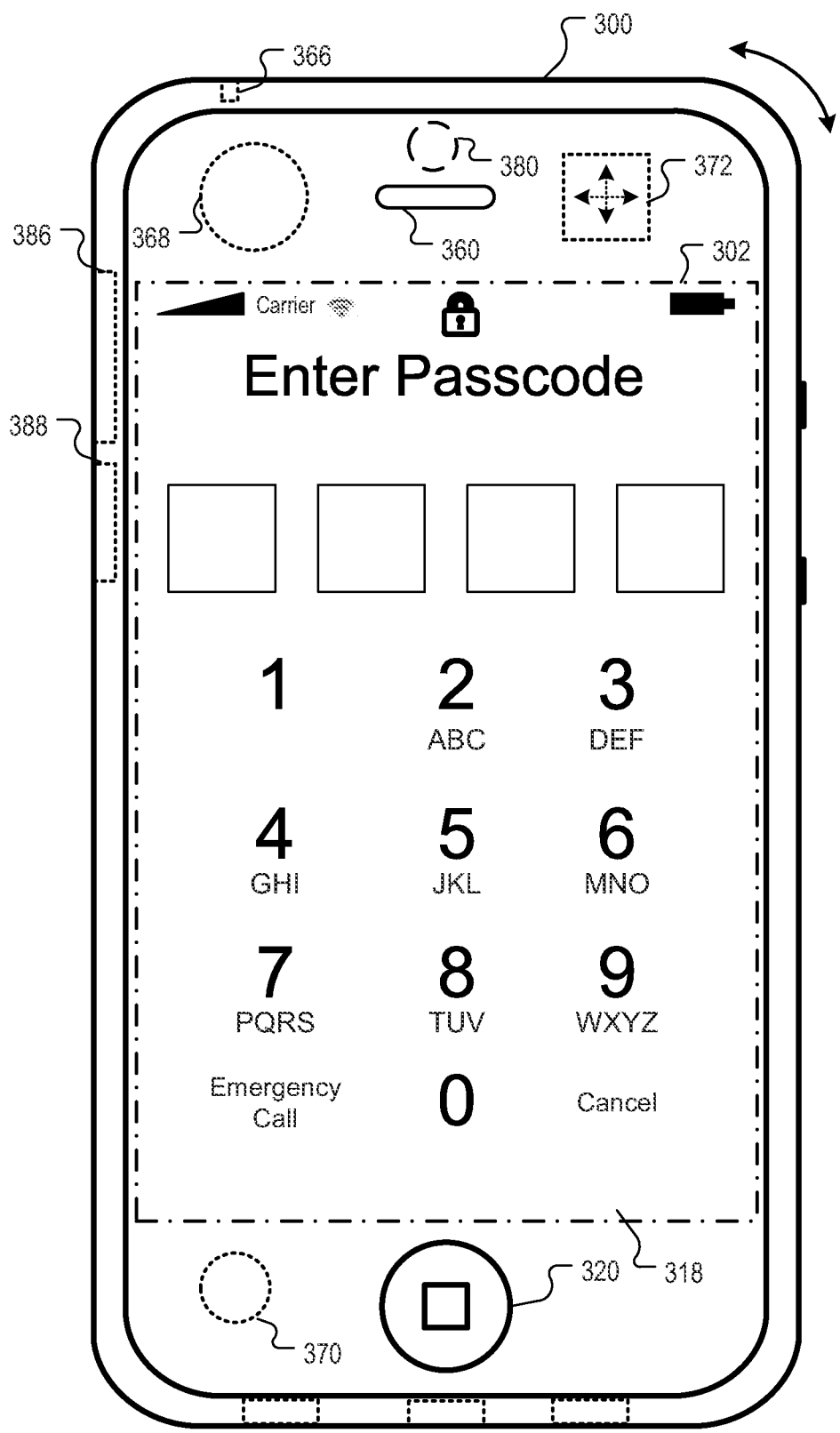
FIG. 3B is another block diagram of an example implementation of the mobile device of FIG. 1 with a security wall in standby mode.

Mobile device 300 can require different security inputs before a user is given access to functionality of the mobile device 300. In FIG. 3A, a sliding motion performed by a user in contact with the touch-sensitive display 302 can trigger unlocking of the mobile device 300. In general, the sliding motion input prevents accidental unlocking of the mobile device 300. A different input can also be required to unlock the mobile device 300, such as entering a security code, as depicted in FIG. 3B. This prevents users who do not have permission to access applications on the mobile device 300 from gaining access to applications.

In some instances, an owner of the mobile device 300 may be indifferent to unwanted access to certain applications on the mobile device 300. For example, certain applications may not contain any personal information that the owner wishes to keep private. In addition, the owner may prefer easy access to some applications and may be willing to risk unwanted access to those applications even if personal information is accessible through the applications. Universal application of a security wall as depicted in FIGS. 3A and 3B to all applications on the mobile device 300, however, may slow the owner from accessing certain applications due to the additional security inputs required.

Figure 3C:
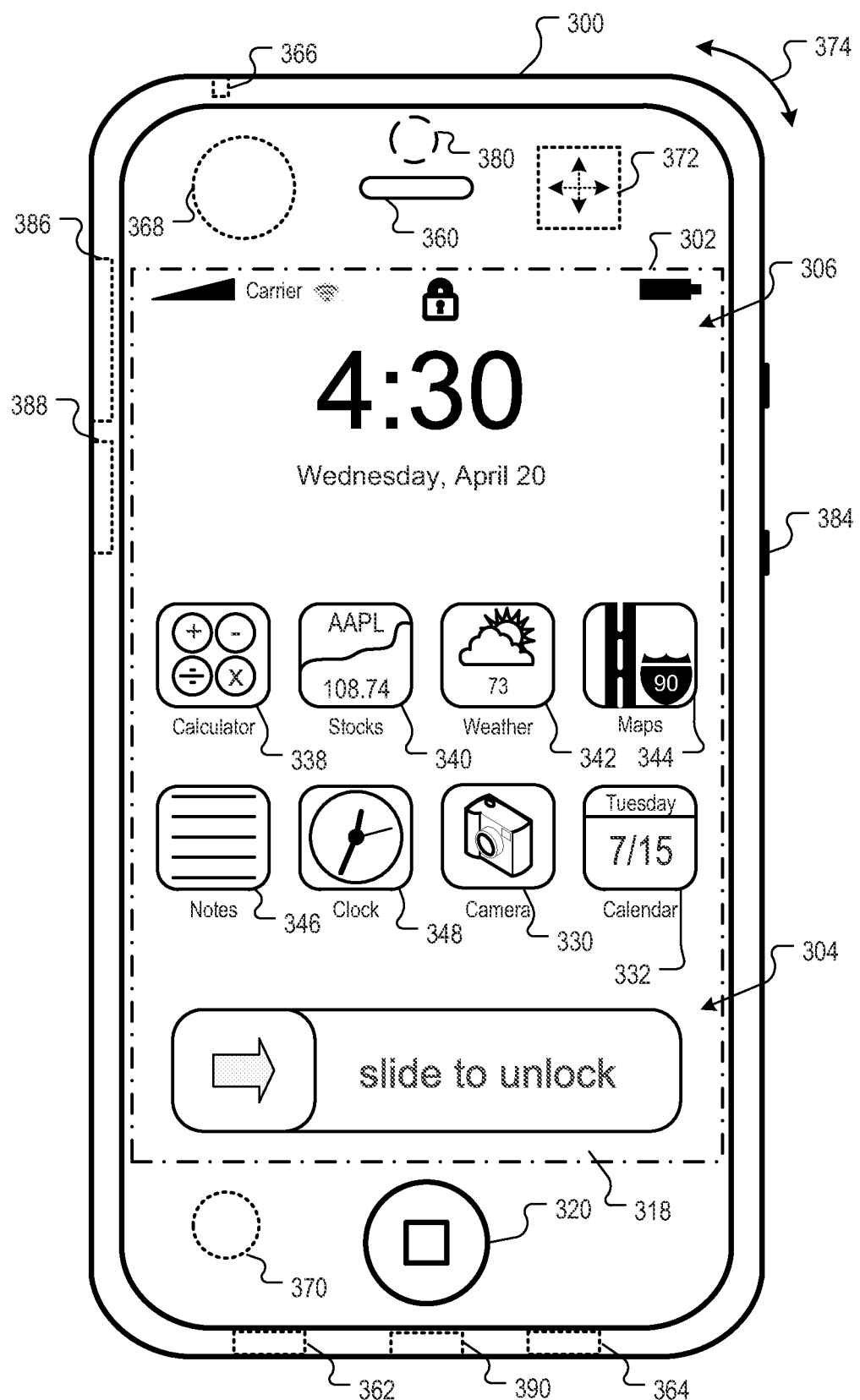
FIG. 3C is a block diagram of an example implementation of the mobile device of FIG. 1 in a public mode.

FIG. 3C illustrates a display of applications available to a user on the mobile device 300 without requiring a security input from the user. The applications available to the user are represented in the display 302 as display objects 330, 332, 338, 340, 342, 344, 346, and 348. The display objects in FIG. 3C are presented in a "public mode" of the mobile device 300. In public mode, the mobile device 300 may present only objects of applications designated as public and allow access to those applications without enforcing a security wall with respect to those applications. In contrast, in private mode, the mobile device 300 may require security inputs such as those depicted in FIGS. 3A and 3B before allowing access to applications designated for private functionality. In some instances, applications designated for public functionality are accessible in both a public mode and a private mode. Further, during public mode, the mobile device 300 may present only a subset of all applications designated for public access at a time. Different groups of public applications may be presented in the display depending on the context. Touching one of the objects 330, 332, 338, 340, 342, 344, 346, or 348 displayed in public mode can invoke the corresponding functionality associated with the display object without first entering a security input such as described in relation to FIG. 3A or 3B.

Various inputs can trigger a public mode of the mobile device 300 and switch the mobile device 300 from standby mode to public mode. For example, a predefined sequence of multiple inputs associated with a tactile button 384 on the mobile device 300 may trigger the public mode of the mobile device 300, such as two presses of the button 384 in quick succession or pressing the button 384 in a particular pattern.

In some implementations, the tactile button 384 may be associated with receiving input for a functionality of the mobile device 300 other than triggering a public mode of the mobile device 300. For example, tactile button 384 can be associated with receiving input for changing a volume of a speaker on the mobile device 300 or for switching the mobile device 300 into a standby mode. In other words, tactile button 384 can be used to enter particular inputs to trigger a public mode of the mobile device 300 as well as other functions of the mobile device 300. In some examples, dual buttons used for increasing and decreasing the volume of the mobile device 300 can also be used to trigger a public mode of the mobile device 300. For example, a particular combination of inputs for increasing and/or decreasing the volume may trigger the public mode such as two presses of the "volume up" button followed immediately by one press of the "volume down" button. In other instances, specific inputs on the touch-sensitive display 302 of mobile device 300 may switch the mobile device 300 into public mode. Other inputs for triggering activation of the public mode of mobile device 300 are also within the scope of the present disclosure.

In some implementations, the applications are designated for public access based on user selection. For example, the user can select individual applications for public access by designating certain applications provided by the mobile device 300 as public applications. Selected applications can then be made available to the user in a public mode of the mobile device 300 without entering a security code. In certain instances, an application developer can designate applications for private or public functionality. For example, the application developer can tag a particular application as public or private during development of the application, or the developer or a user may specify the application as public or private through an application programming interface (API) of the operating system on mobile device 300. In some implementations, the developer can create an application for distribution through an online store, for example, and the designation of the application as public or private can be published in the online store to notify potential users of the developer's designation. Different aspects of the same application can be designated as public or private, such as described below in relation to FIG. 3E.

In some instances, the mobile device 300 may support different modes in which some modes automatically designate certain applications as public based on a particular context associated with the mobile device 300 or a user of the mobile device 300. For example, applications may be automatically designated as public based on how recently an application was used. Further, among public applications, the public applications displayed in the display area 302 of the mobile device 300 may be determined based on when the application was previously used. The designation or display of applications in public mode can also be based on other factors such as frequency of use of a particular application or a type of application. For example, applications having personal information, such as an address book application or an online banking application, may be designated for private access to protect against unwanted access whereas certain applications, such as a music player or a computer game, may be designated for public access because a user is likely to be indifferent to public access to those types of applications.

Figure 3D:
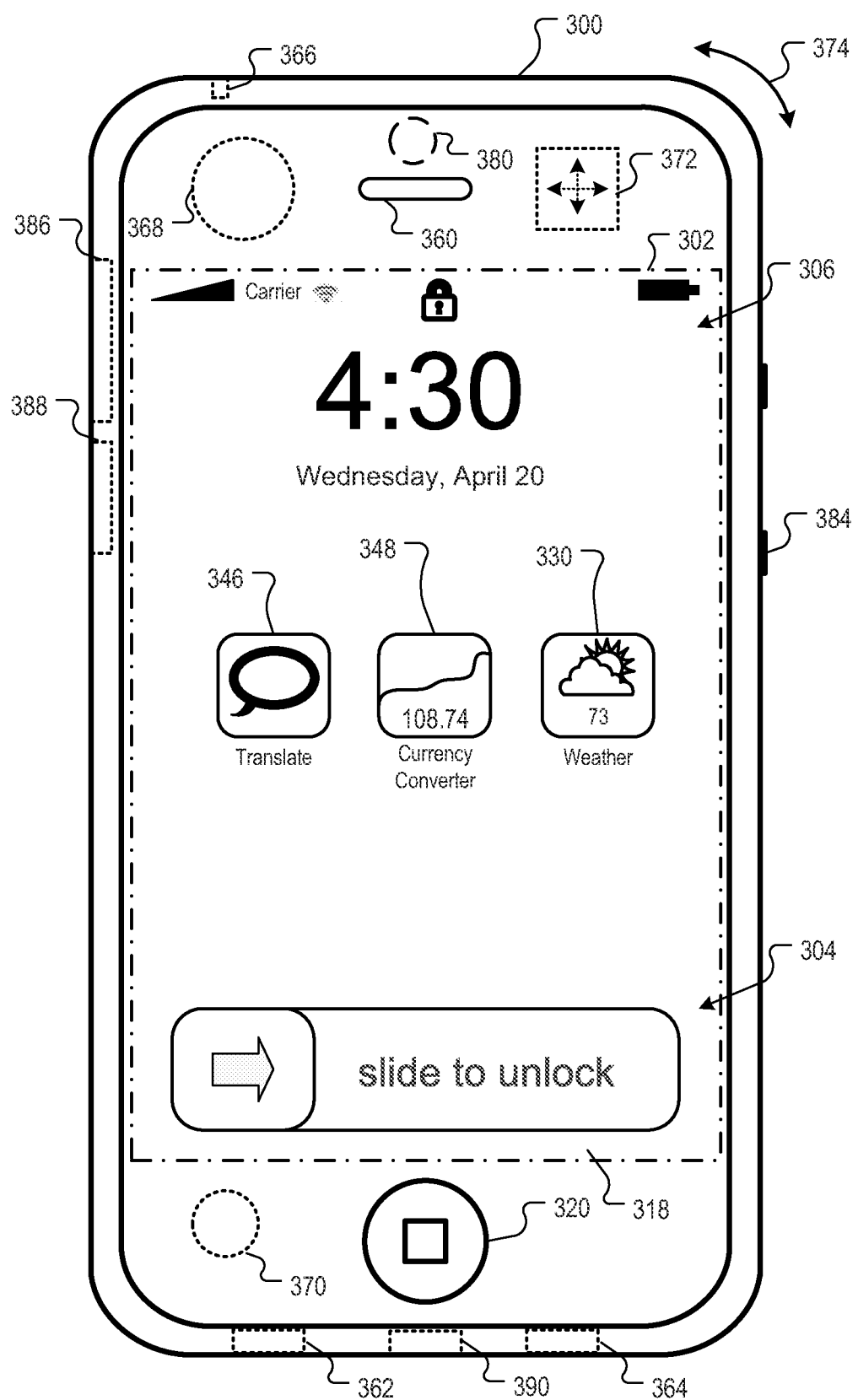
FIG. 3D is another block diagram of an example implementation of the mobile device of FIG. 1 in a public mode.

Designation of applications can also be based on a context associated with the mobile device. In some implementations, applications associated with a particular context are grouped and displayed together in a public mode of the mobile device 300. FIG. 3D illustrates an example implementation in which certain applications are grouped together and displayed to a user based on a geographic location of the mobile device 300. For example, the mobile device may include a navigation system or other feature that can determine a particular current location of the mobile device. In some implementations, the mobile device 300 determines its current location using GPS or any other positioning system. In some implementations, the current location, as determined using GPS, can be expressed in latitude/longitude. In some implementations, the mobile device 300 can, optionally, convert the latitude/longitude of the current location to an address (e.g., street, city, country) by referencing a database of latitudes/longitudes and locations that is stored in memory, for example. The mobile device 300 can obtain its geographic position by other means as well. For example, a mobile device 300 can obtain its position using cellular phone tower triangulation, Wi-Fi positioning, a combination of GPS and other signals, differential GPS, and any other suitable technologies and techniques.

The mobile device can automatically designate applications that are likely to be used given the particular current location. For example, if a navigation system of the mobile device 300 determines that the user is located in a particular foreign country based on the location of the mobile device 300, applications that are helpful to the user may be automatically designated as public applications and displayed in a public mode of the mobile device 300, as illustrated in FIG. 3D. In the illustrated example, objects associated with a translation application 346, a currency converter application 348, and a weather application 330 are displayed in a public mode of the mobile device 300. The user may view and access functionality associated with the displayed applications without entering a security code.

In another example, the mobile device 300 may determine a particular activity currently performed by the user based on relative motion of the mobile device at a particular time. The accelerometer 372 of the mobile device 300 may be used to detect movement of the mobile device 300, allowing determination of the current activity of the user based on distinguishing characteristics of the movement. If the motion of the mobile device 300 indicates that the user is running, for example, applications related to recreational running may be automatically designated as public applications and displayed in the mobile device 300 in public mode.

Applications can be grouped based on other contexts associated with certain applications or with the mobile device 300. For example, applications may be designated for public functionality and grouped together for display in a public mode of the mobile device 300 based on a current date or time of day. Applications associated with tasks performed in the morning, such as daily news, weather, traffic, or radio, are automatically grouped together and displayed in a public mode of the mobile device 300 during morning hours. Other applications may be designated for public functionality during other times of the day depending on the application function. In some implementations, the designation and grouping of applications can be connected with a calendar application on the mobile device 300. Accordingly, applications associated with imminent deadlines, events, or holidays, for example, can be automatically designated for public functionality as a particular calendar date draws near.

The automatic designations of applications can be dynamic. In certain instances, an application can be designated for public functionality, but the designation of the application may automatically change over time or as a particular context changes. For example, frequent use of a particular application may automatically trigger designation of the application for public functionality. After a period of time, the application may be used less frequently, and after a certain time has passed, the application may automatically be designated for private functionality.

Figure 3E:
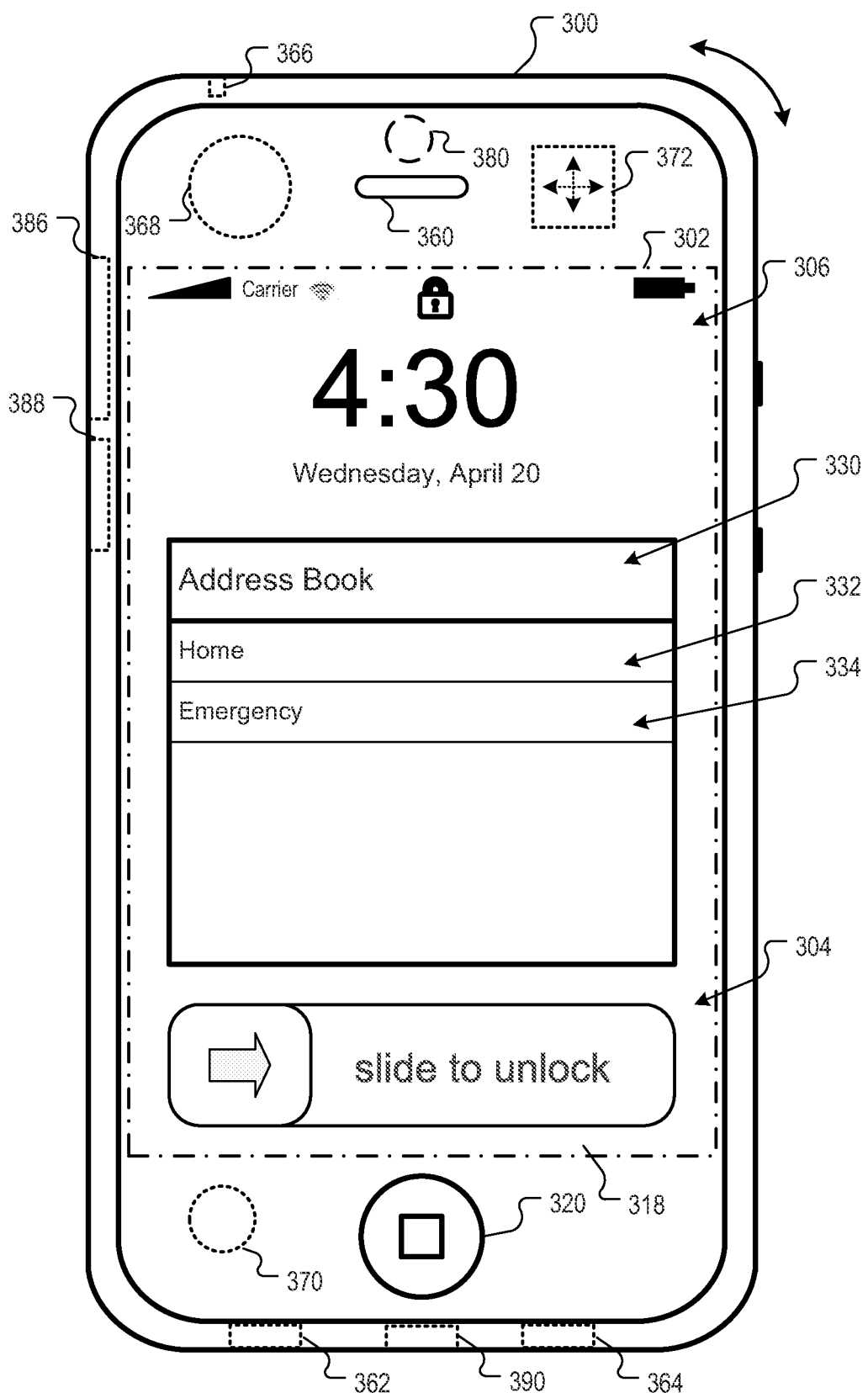
FIG. 3E is another block diagram of an example implementation of the mobile device of FIG. 1 in a public mode.

FIG. 3E illustrates display of a particular function of an application that has been designated for public access. In some implementations, particular features or portions of an application may be designated for public access while remaining portions remain designated for private access. For example, an e-mail application may be designated for private access in general, but a specific function in the e-mail application, such as a calendar feature associated with the e-mail application or the ability to read e-mails, may be available for public access. In some instances, certain less-sensitive features in an application can be designated for public functionality. Features that are generally regarded as more important can be designated for public functionality. As illustrated in FIG. 3E, in an address book 330 of the mobile device 300, certain contacts may be publicly accessible, such as an emergency number 334 or a personal home number 332. The remaining contacts in the address book 330, however, remain designated for private functionality and are only accessible after input of a security code.

In another example, a camera application on the mobile device 300 can generally take pictures and present photos taken using the camera application to a user. The camera application can have certain functionality designated for public access, such as permitting a user to take pictures in public mode but only allowing review of pictures that were taken in public mode. The review of other pictures in the camera application can be restricted to private access. In some implementations, functionality associated with purchases within an application can be automatically designated for private access. For example, a video game application on the mobile device 300 can allow a user to make in-game purchases, such as purchases for additional lives or coins within the game. The in-game purchasing functionality can be restricted to private access such that a user of mobile device 300 in public mode can play the video game application but is prohibited from making purchases within the game unless the user enters a private mode of the mobile device 300.

Figure 4:
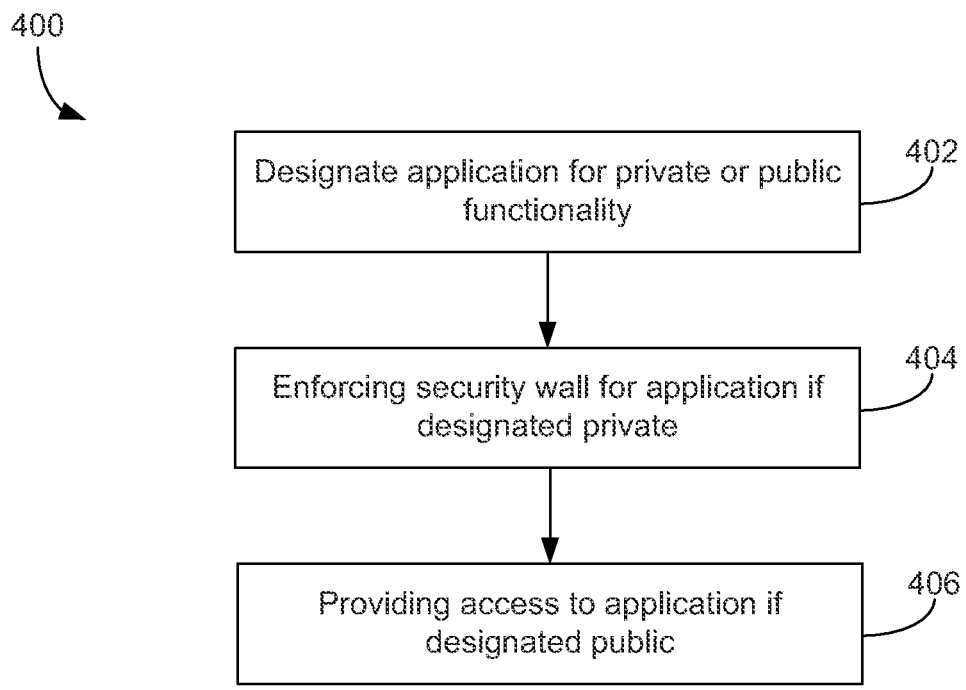
FIG. 4 is a flow diagram illustrating an example process for designating applications for public access or private access on a computing device.

Exemplary Processes for Designating and Displaying Public and Private Applications FIG. 4 is a flow diagram of an exemplary process 400 for designating and displaying public and private applications. In the exemplary process 400, an application is designated for private or public functionality (402). The designation of an application for public or private functionality may be based on user input or automatically determined based on a context or application type associated with the application. Certain types of applications may be designated for public functionality. In some instances, certain applications are designated for public functionality based on frequency of use. A security wall is enforced for the application if the application is designated as private (404). Users may be required to input a security code in order to access the functionality of applications designated as private. Access to the application is provided if the application is designated as public (406). Users may be given access to applications designated as public without entering the security code.

Figure 5:
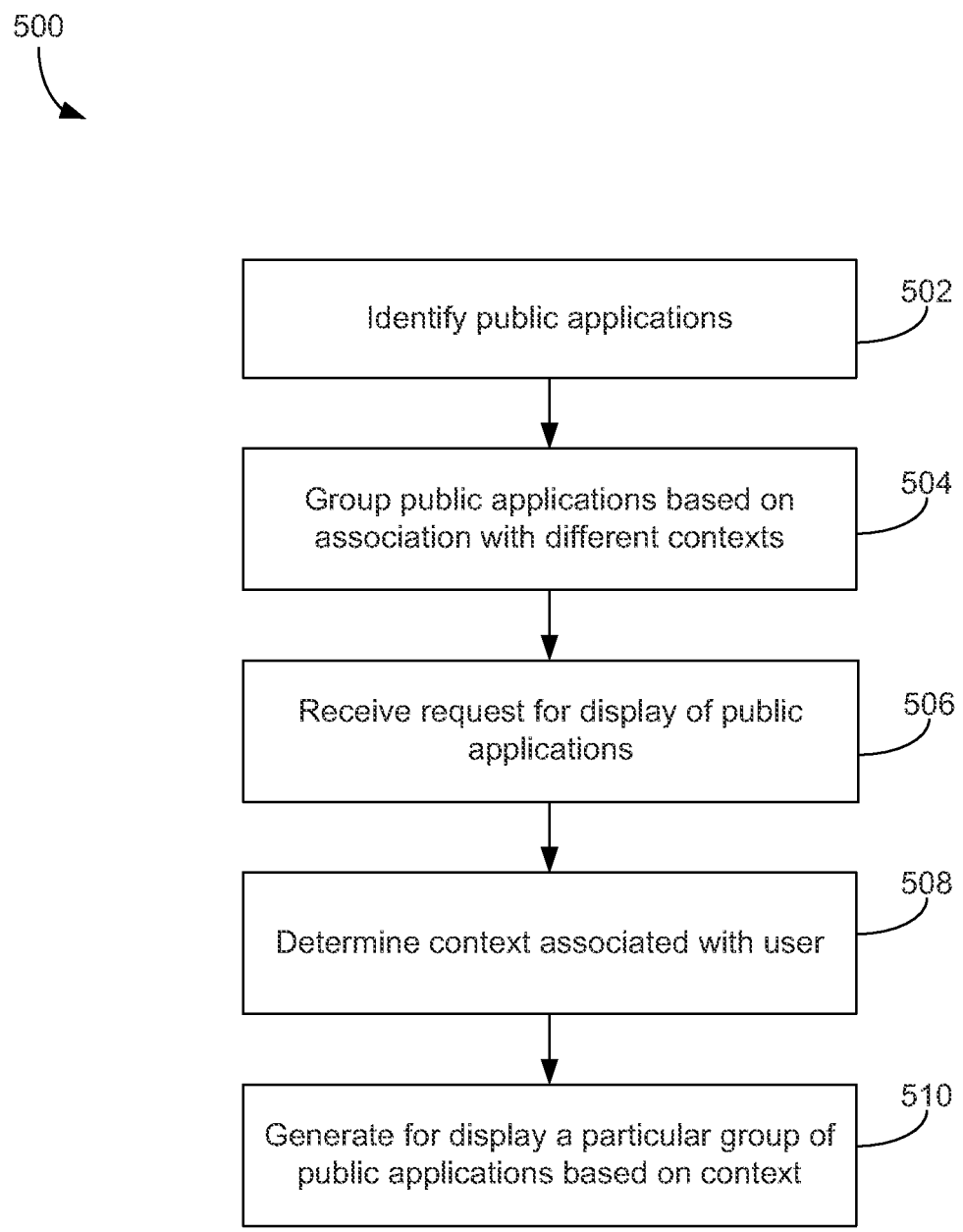
FIG. 5 is a flow diagram illustrating another example process for designating applications for public access or private access on a computing device.

FIG. 5 is a flow diagram of an exemplary process 500 for determining a group of applications for display on a device. In the exemplary process 500, public applications on the device are identified (502). The public applications are grouped based on association with different contexts (504). A context may be any factor associated with the applications or with the device executing the applications that is shared among certain applications. Examples of contexts may be geographic location, type of application, current activity associated with a user of the device executing the applications, demographic or personal information associated with the user, or other attributes that may be associated with different applications on a device. Accordingly, applications that are associated with the same context may be grouped together.

A request for display of public applications is received (506). A context associated with a user of the device is determined (508). The determination of the context associated with the user may include determining a geographic location of the user or a current activity of the user based on various signals received on the device. A particular group of public applications is generated for display based on the context (510).

The above processes are merely examples. Various combinations of the above processes are possible.

Exemplary Device Architecture

Figure 6:
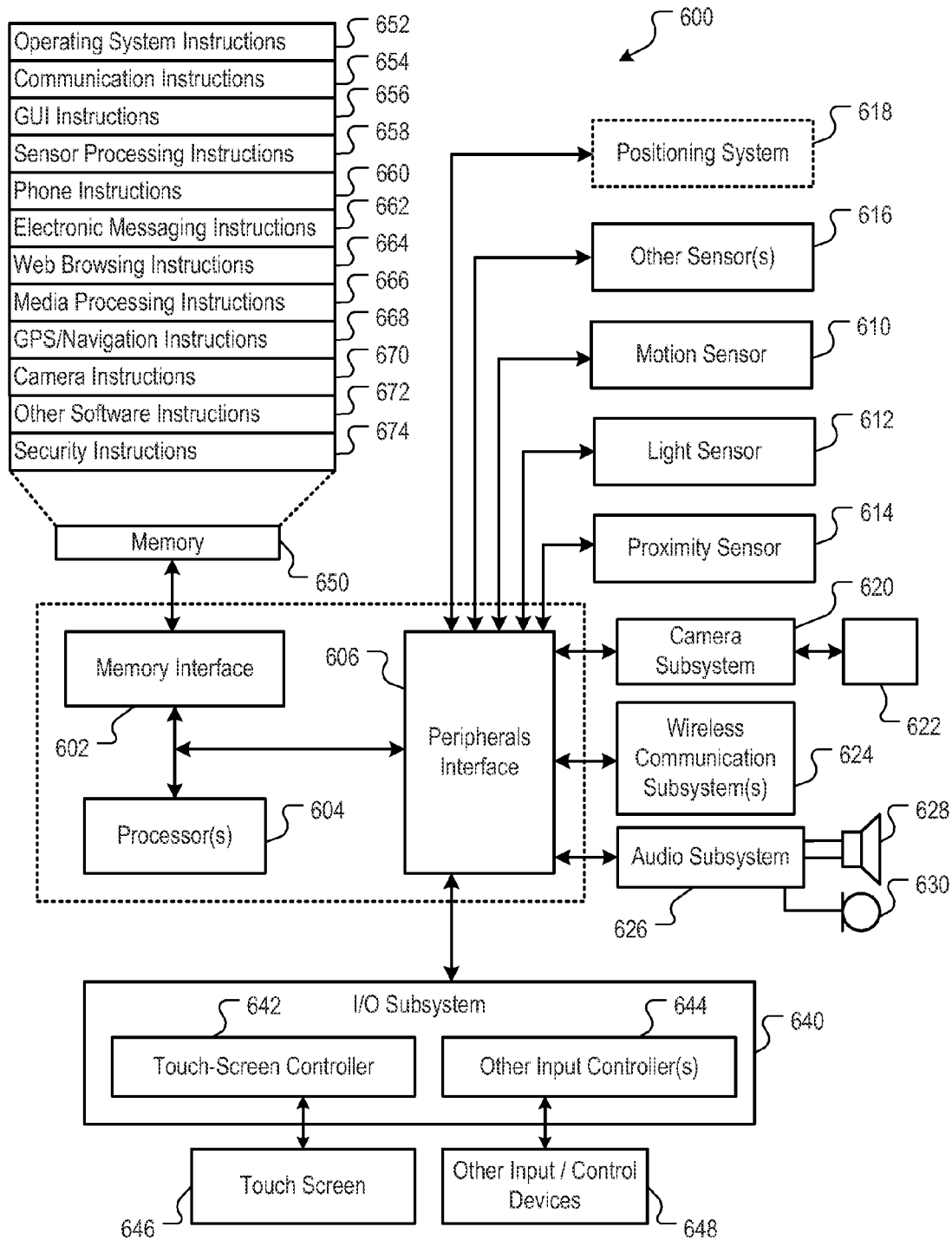
FIG. 6 is a block diagram of exemplary hardware architecture for implementing the user interfaces and processes described in reference to FIGS. 1-5.

FIG. 6 is a block diagram 600 of an example implementation of the mobile device 100 of FIG. 1. The mobile device 100 can include a memory interface 602 one or more data processors, image processors and/or central processing units 604, and a peripherals interface 606. The memory interface 602, the one or more processors 604 and/or the peripherals interface 606 can be separate components or can be integrated in one or more integrated circuits. The various components in the mobile device 100 can be coupled by one or more communication buses or signal lines.

Sensors, devices and subsystems can be coupled to the peripherals interface 606 to facilitate multiple functionalities. For example, a motion sensor 610, a light sensor 612, and a proximity sensor 614 can be coupled to the peripherals interface 606 to facilitate the orientation, lighting and proximity functions described with respect to FIG. 1. Other sensors 616 can also be connected to the peripherals interface 606, such as a GPS receiver, a temperature sensor, a biometric sensor, or other sensing device, to facilitate related functionalities.

A camera subsystem 620 and an optical sensor 622, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 624, which can include radio frequency receivers and transmitters and/or optical (e.g., infrared) receivers and transmitters. The specific design and implementation of the communication subsystem 624 can depend on the communication network(s) over which the mobile device 100 is intended to operate. For example, a mobile device 100 may include communication subsystems 624 designed to operate over a GSM network, a GPRS network, an EDGE network, a 3G or 4G network, a Wi-Fi or WiMax network, and a Bluetooth™ network. In particular, the wireless communication subsystems 624 may include hosting protocols such that the device 100 may be configured as a base station for other wireless devices.

An audio subsystem 626 can be coupled to a speaker 628 and a microphone 630 to facilitate voice-enabled functions, such as voice recognition, voice replication, digital recording, and telephony functions.

The I/O subsystem 640 can include a touch screen controller 642 and/or other input controller(s) 644. The touch-screen controller 642 can be coupled to a touch screen 646. The touch screen 646 and touch screen controller 642 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 646.

The other input controller(s) 644 can be coupled to other input/control devices 648, such as one or more buttons, rocker switches, thumb-wheel, infrared port, USB port, and/or a pointer device such as a stylus. The one or more buttons (not shown) can include an up/down button for volume control of the speaker 628 and/or the microphone 630.

In one implementation, a pressing of the button for a first duration may disengage a lock of the touch screen 646; and a pressing of the button for a second duration that is longer than the first duration may turn power to the mobile device 100 on or off. The user may be able to customize a functionality of one or more of the buttons. The touch screen 646 can, for example, also be used to implement virtual or soft buttons and/or a keyboard.

In some implementations, the mobile device 100 can present recorded audio and/or video files, such as MP3, AAC, and MPEG files. In some implementations, the mobile device 100 can include the functionality of an MP3 player, such as an iPod™. The mobile device 100 may, therefore, include a 36-pin connector that is compatible with the iPod. Other input/output and control devices can also be used.

The memory interface 602 can be coupled to memory 650. The memory 650 can include high-speed random access memory and/or non-volatile memory, such as one or more magnetic disk storage devices, one or more optical storage devices, and/or flash memory (e.g., NAND, NOR). The memory 650 can store an operating system 652, such as Darwin, RTXC, LINUX, UNIX, OS X, WINDOWS, or an embedded operating system such as VxWorks. The operating system 652 may include instructions for handling basic system services and for performing hardware dependent tasks. In some implementations, the operating system 652 handles timekeeping tasks, including maintaining the date and time (e.g., a clock) on the mobile device 100. In some implementations, the operating system 652 can be a kernel (e.g., UNIX kernel).

The memory 650 may also store communication instructions 654 to facilitate communicating with one or more additional devices, one or more computers and/or one or more servers. The memory 650 may include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GPS/Navigation instructions 668 to facilitate GPS and navigation-related processes and instructions; camera instructions 670 to facilitate camera-related processes and functions; other software instructions 672 to facilitate other related processes and functions; and/or security instructions 674, together with graphical user interface instructions 656, to implement the features and processes of FIGS. 1-5.

The memory 650 can also store data, including but not limited to documents, images, video files, audio files, and other data.

In some implementations, the mobile device 100 includes a positioning system 618. In various implementations, the positioning system 618 can be provided by a separate device coupled to the mobile device 100, or can be provided internal to the mobile device. In some implementations, the positioning system 618 can employ positioning technology including a GPS, a cellular grid, URIs or any other technology for determining the geographic location of a device. In some implementations, the positioning system 618 can employ a service provided by a positioning service such as, for example, SkyHook Wireless of Boston, Mass., or Rosum Corporation of Mountain View, Calif. In other implementations, the positioning system 618 can be provided by an accelerometer and a compass using dead reckoning techniques. In such implementations, the user can occasionally reset the positioning system by marking the mobile device's presence at a known location (e.g., a landmark or intersection). In still other implementations, the user can enter a set of position coordinates (e.g., latitude, longitude) for the mobile device. For example, the position coordinates can be typed into the phone (e.g., using a virtual keyboard) or selected by touching a point on a map. Position coordinates can also be acquired from another device (e.g., a car navigation system) by syncing or linking with the other device. In other implementations, the positioning system 618 can be provided by using wireless signal strength and one or more locations of known wireless signal sources to provide the current location. Wireless signal sources can include access points and/or cellular towers. Other techniques to determine a current location of the mobile device 100 can be used and other configurations of the positioning system 618 are possible.

Each of the above identified instructions and applications can correspond to a set of instructions for performing one or more functions described above. These instructions need not be implemented as separate software programs, procedures or modules. The memory 650 can include additional instructions or fewer instructions. Furthermore, various functions of the mobile device 100 may be implemented in hardware and/or in software, including in one or more signal processing and/or application specific integrated circuits.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims.

What is claimed is:

1. A method performed by one or more processors executing on a computer device, the method comprising:
   determining a current geographic location of the computer device;
   determining a frequency of use of an application on the computer device at the current geographic location;
   determining a level of importance of the application on the computer device at the current geographic location;
   designating the application on the computer device for private functionality and public functionality, where the computer device has a public mode and a private mode of operation, where the application is automatically designated based on the current geographic location of the computer device, the frequency of use of the application and the level of importance of the application at the current geographic location;
   wherein designating the application on the computer device for private functionality comprises allowing limited access to one or more specific functions of the application while the computing device in a locked mode;
   wherein the private functionality of the application includes a purchasing functionality allowing a user to conduct a purchase through the application;
   determining that the computer device is running in the public mode of operation;
   while the computer device is running in the public mode of operation, enforcing a security wall on the application with respect to the private functionality of the application, wherein enforcing the security wall includes allowing user access to the public functionality of the application but not the private functionality of the application; and
   in response to receiving a security input, switching from the public mode of operation to the private mode of operation of the computer device and presenting one or more objects that are selectable to invoke public and private applications while the computer device is in the private mode of operation.

2. The method of claim 1 wherein allowing user access to the public functionality of the application includes generating for display a visual indicator of availability of the application in a public mode of operation of the computer device.

3. The method of claim 2 wherein generating for display the visual indicator includes displaying a particular visual indicator for each application in a group of applications, wherein each application in the group of applications is designated for public functionality.

4. The method of claim 1 wherein the application is a photo application and the public functionality is taking pictures and the private functionality is reviewing pictures taken while the computer device is in the private mode of operation.

5. The method of claim 1 further comprising automatically designating the application for private functionality after a certain time period has elapsed since a previous use of the particular application.

6. The method of claim 1, where the current geographic location of the computing device is determined by a sensor of the computer device.

7. A computer program product embodied in a non-transitory computer-readable storage medium, the computer program product including instructions that, when executed, perform operations comprising:
  determining a current geographic location of a computer device;
  determining a frequency of use of an application on the computer device at the current geographic location;
  determining a level of importance of the application on the computer device at the current geographic location;
  designating the application on the computer device for private functionality and public functionality, where the computer device has a public mode and a private mode of operation, where the application is automatically designated based on the current geographic location of the computer device, the frequency of use of the application and the level of importance of the application at the current geographic location;
  wherein designating the application on the computer device for private functionality comprises allowing limited access to one or more specific functions of the application while the computer device in a locked mode;
  wherein the private functionality of the application includes a purchasing functionality allowing a user to conduct a purchase through the application;
  determining that the computer device is running in the public mode of operation;
  while the computer device is running in the public mode of operation, enforcing a security wall on the application with respect to the private functionality of the application, wherein enforcing the security wall includes allowing user access to the public functionality of the application but not the private functionality of the application; and
  in response to receiving a security input, switching from the public mode of operation to the private mode of operation of the computer device and presenting one or more objects that are selectable to invoke public and private applications while the computer device is in the private mode of operation.

8. The computer program product of claim 7 wherein allowing the user to interact with the private functionality of the application includes requiring a second input from the user before allowing the user to interact with the application, the second input different from the security input.

9. The computer program product of claim 7 wherein the private functionality of the application includes a purchasing functionality allowing the user to conduct a purchase through the application.

10. The computer program product of claim 7, where the current geographic location of the computer device is determined by a sensor of the computer device.

11. A computer device comprising:
  one or more processors; and
  a non-transitory computer-readable storage medium operable to store instructions which, when executed by the one or more processors, causes the one or more processors to perform operations comprising:
  determining a current geographic location of the computer device;
  determining a frequency of use of an application on the computer device at the current geographic location;
  determining a level of importance of the application on the computer device at the current geographic location;
  designating the application on the computer device for private functionality and public functionality, where the computer device has a public mode and a private mode of operation, where the application is automatically designated based on the current geographic location of the computer device, the frequency of use of the application and the level of importance of the application at the current geographic location;
  wherein designating the application on the computer device for private functionality comprises allowing limited access to one or more specific functions of the application while the computer device in a locked mode;
wherein the private functionality of the application includes a purchasing functionality allowing a user to conduct a purchase through the application;
  determining that the computer device is running in the public mode of operation;
  while the computer device is running in the public mode of operation, enforcing a security wall on the application with respect to the private functionality of the application, wherein enforcing the security wall includes allowing user access to the public functionality of the application but not the private functionality of the application; and
  in response to receiving a security input, switching from the public mode of operation to the private mode of operation of the computer device and presenting one or more objects that are selectable to invoke public and private applications while the computer device is in the private mode of operation.

12. The computer device of claim 11 wherein providing access to the application includes displaying a particular visual indicator for each application in a group of applications, wherein each application in the group of applications is designated for public functionality.

13. The computer device of claim 11, where the current geographic location of the computer device is determined by a sensor of the computer device.

* * * * *